(12) United States Patent
Chen

(10) Patent No.: US 8,141,456 B2
(45) Date of Patent: Mar. 27, 2012

(54) MULTIPURPOSE PEDAL

(76) Inventor: Chung-I Chen, Taichung Hsien (TW)

(*) Notice: Subject to any disclaimer, the term of this patent is extended or adjusted under 35 U.S.C. 154(b) by 368 days.

(21) Appl. No.: 12/582,705

(22) Filed: Oct. 20, 2009

(65) Prior Publication Data

US 2011/0088508 A1 Apr. 21, 2011

(51) Int. Cl.
*B62M 3/08* (2006.01)
(52) U.S. Cl. ....................................................... 74/594.6
(58) Field of Classification Search ................. 74/594.4, 74/594.6
See application file for complete search history.

(56) References Cited

U.S. PATENT DOCUMENTS

| 6,640,663 | B1 * | 11/2003 | Steinberg | 74/594.6 |
| 7,258,042 | B2 * | 8/2007 | Couturet et al. | 74/594.6 |
| 2004/0168542 | A1 * | 9/2004 | Hermansen et al. | 74/594.4 |
| 2006/0266154 | A1 * | 11/2006 | Hermansen et al. | 74/594.4 |

* cited by examiner

*Primary Examiner* — Vicky Johnson

(57) ABSTRACT

A multipurpose pedal includes a spindle assembly and a pedal pivotally assembled with the spindle assembly. The spindle assembly includes a spindle adapting to assemble with a bicycle crank and a tube sleeved on the spindle. The pedal includes a first frame and a second frame mounted in the first frame. Multiple stubs are mounted between the first frame and the second frame. The multiple stubs are replaceable for providing multipurpose.

5 Claims, 7 Drawing Sheets

MULTIPURPOSE PEDAL

BACKGROUND OF THE INVENTION

1. Field of the Invention

The present invention relates to a pedal, and more particularly to a multipurpose pedal.

2. Description of Related Art

In a bicycle riding, a bicycle is vibrated due to pits or uneven roadway. The vibration causes unstably operations for a rider. Therefore, various vibration absorbers are invented, such as suspension parts for a front/rear fork, a shock-absorbed handlebar, and a cushioning saddle, for absorbing the vibrations to joints of the rider.

However, a specific device for absorbing the vibration to the knees is not existed in the market. The knee joints are easily damaged due to a harmful riding position. Especially, the knee joints are stress points of two legs when riding. The vibrations cause the knee ligaments worn quickly after a long time riding, or an acute injury to the knee ligaments in a sudden vibration.

The present invention has arisen to mitigate and/or obviate the disadvantages of the conventional shock-absorbed device.

SUMMARY OF THE INVENTION

The main objective of the present invention is to provide an improved pedal, and more particular to a multipurpose pedal.

To achieve the objective, the multipurpose pedal in accordance with the present invention includes a spindle assembly and a pedal pivotally assembled with the spindle assembly. The spindle assembly includes a spindle adapting to assemble with a bicycle crank and a tube sleeved on the spindle. The tube has a rib formed on an outer periphery thereof. The tube is rotatable relative to the spindle. The pedal includes a first frame and a second frame mounted in the first frame. Each of the first frame and the second frame has a space defined therein. The second frame is positioned in the space in the first frame. Each of the first frame and the second frame has two connecting portion respectively disposed on two ends thereof. The first frame has a first wing and a second wing respectively formed on two sides thereof. The second frame has a third wing and a forth wing respectively formed on two sides thereof. Each connecting portion has a spindle hole defined therein and extending therethrough for receiving the tube with the spindle. Each spindle hole has at least one groove defined in an inner periphery thereof for movably receiving the rib. The two spindle holes in the first frame are respectively aligned with the two spindle holes in the second frame. The tube with the spindle is inserted into the two spindle holes in the first frame and the two spindle holes in the second frame. Each of the at least one groove has a width greater than that of the rib such that the first frame and the second frame are restrictedly pivotable relative to the tube. The first wing of the second frame is mounted on a top of the third wing of the first frame. The fourth wing of the first frame mounted on a top of the second wing of the second frame. The first frame and the second frame are crossly assembled with respect to the tube. Multiple stubs are mounted between the third wing and the frost wing and between the fourth wing the second wing. The multiple stubs are replaceable to be multiple stubs having different rigidity for providing multipurpose.

In accordance with another aspect of the present invention, each spindle hole has a slot defined in the inner periphery thereof for correspondingly receiving the rib. The rib of the tube is inserted into the slot in each spindle hole such that the first frame and the second frame are fixed relative to the tube. The multiple stubs are replaced to multiple high hardness stubs for forming a stabilized structure.

In accordance with another aspect of the present invention, a clipless pedal is received in the space in the second frame for adapting to be assembled with a riding shoe. The clipless pedal has a spindle hole defined therein the extending therethrough. The spindle hole in the clipless pedal is aligned with the two spindle holes in the first frame and the two spindle holes in the second frame. The spindle hole in the clipless pedal has a groove defined in an inner periphery thereof for correspondingly receiving the rib. The clipless pedal is provided for connecting to the riding shoe such that the user can effectively operate the pedal.

Further benefits and advantages of the present invention will become apparent after a careful reading of the detailed description with appropriate reference to the accompanying drawings.

DETAILED DESCRIPTION OF THE INVENTION

Figure 1:
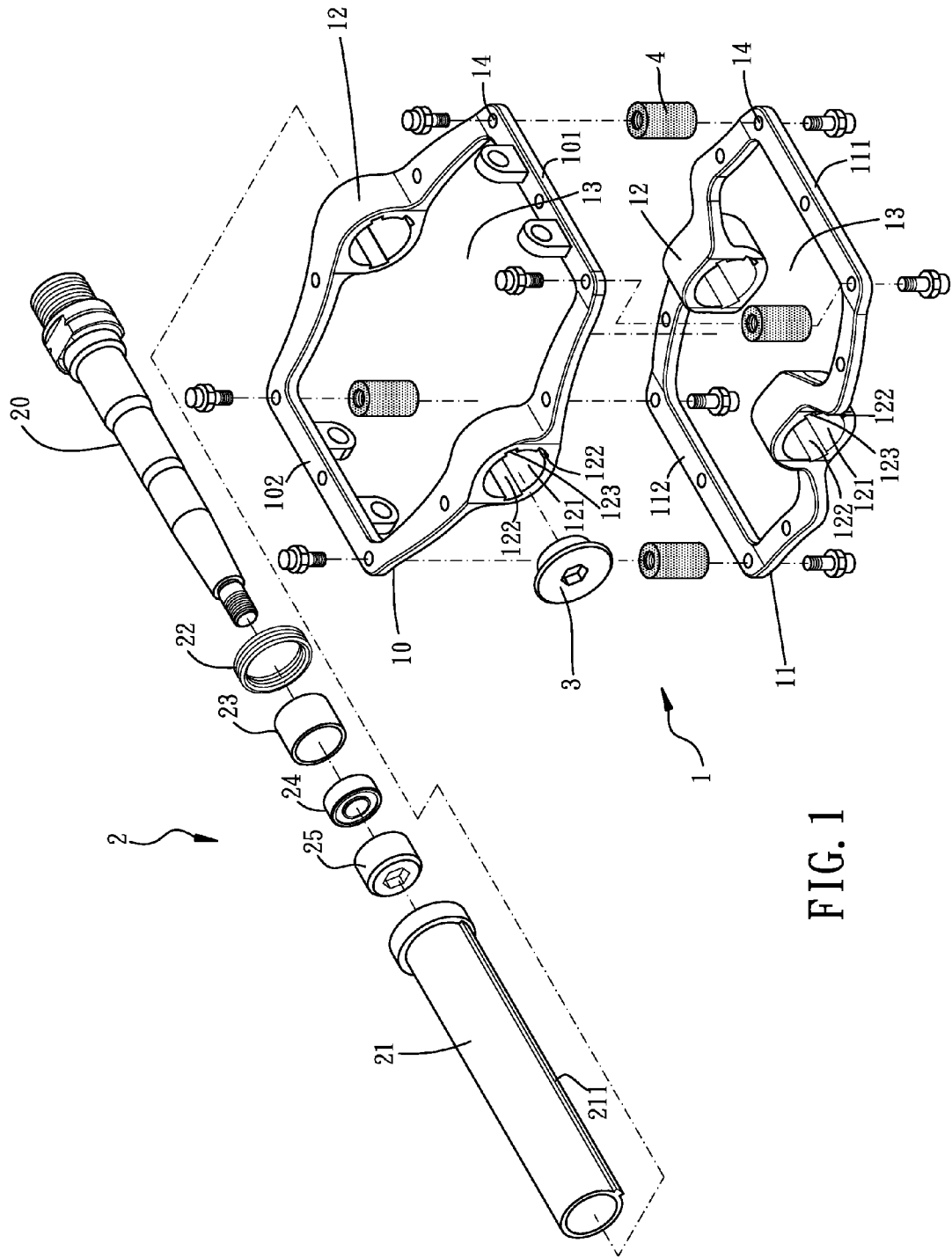
FIG. 1 is an exploded perspective view of a multipurpose pedal in accordance with the present invention.
Figure 2:
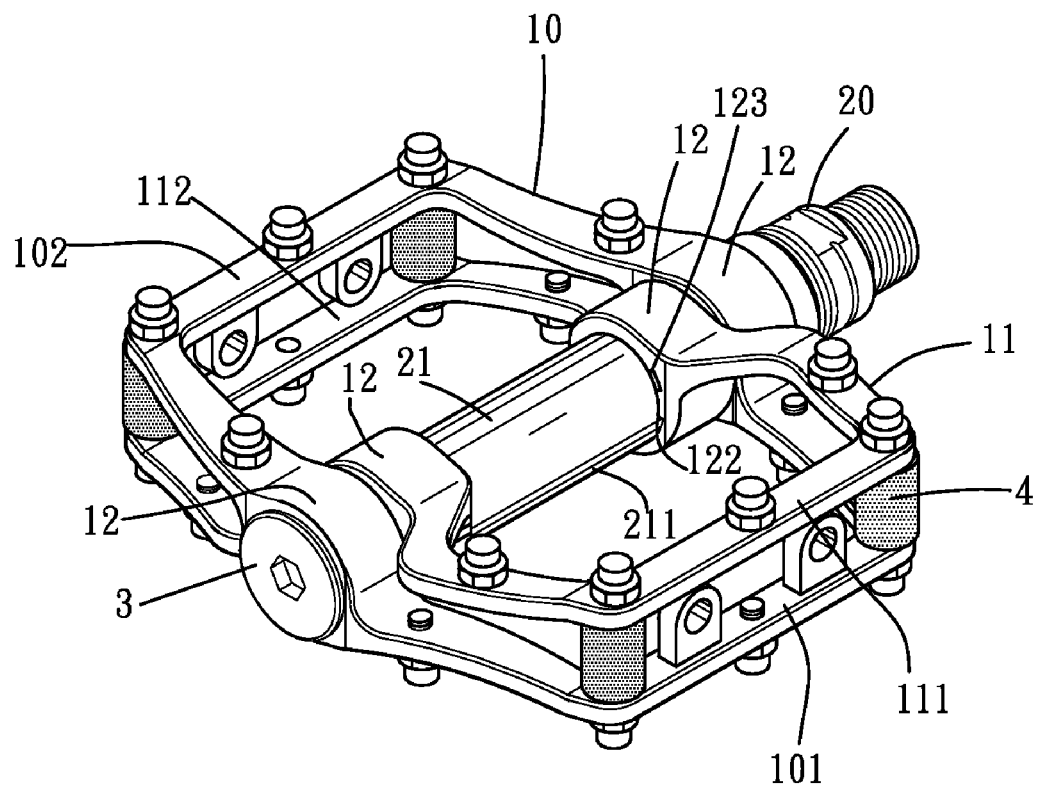
FIG. 2 is an assembled perspective view of the multipurpose pedal in FIG. 1.

Referring to the drawings and initially to FIGS. 1-2, a multipurpose pedal in accordance with the present invention comprises a spindle assembly 2 and a pedal 1 mounted on the spindle assembly 2.

The spindle assembly 2 includes a spindle 20 adapting to assemble with a bicycle crank (not shown) and a tube 21 sleeved on the spindle 20 for assembling with the pedal 1. The spindle 20 is sequentially penetrated into a plastic ring 22, a position ring 23, a bearing 24, and a sleeve 25 to be received in the tube 21. The tube 21 has a rib 211 radially formed on an outer periphery thereof. The tube 21 is rotatable relative to the spindle 20. The plastic ring 22 is provided for preventing the spindle 20 from overly rubbing against an inner periphery of the tube 21. The bearing 24 is positioned between the position ring 23 and the sleeve 25 such that the bearing 24 is provided for the spindle 20 rotating relative to the tube 21.

The pedal 1 includes a first frame 10 and a second frame 11 mounted in the first frame 10. Each of the first frame 10 and the second frame 11 has a space 13 defined therein. The second frame 11 is positioned in the space 13 in the first frame 10. Each of the first frame 10 and the second frame 11 has two connecting portions 12 respectively disposed on two ends thereof. Each connecting portion 12 has a spindle hole 121 defined therein and extending therethrough for receiving the tube 21 with the spindle 20. The two spindle holes 121 in the first frame 10 are aligned to each other. The two spindle holes 121 in the second frame 11 are aligned to each other. The two spindle holes 121 in the first frame 10 are respectively aligned with the two spindle holes 121 in the second frame 11 such that the tube 21 with the spindle 20 is received in the two spindle holes 121 in the first frame 10 and the two spindle holes 121 in the second frame 11. Each spindle hole 121 has a slot 123 defined in an inner periphery thereof for correspondingly receiving the rib 211 and two grooves 122 defined in the inner periphery thereof for movably receiving the rib 211. Each groove 122 has a width greater than that of the rib 211 such that the rib 211 is movably received in the groove 122. The two grooves 122 can have different width for selectively receiving the rib 211 such that the first frame 10 and the second frame 11 are adjustably approached to each other for adjusting levels of the shack-absorbed effect. When the rib 211 is inserted into the slot 123 of the each spindle hole 121, the first frame 10 and the second frame 11 are fixed relative to the tube 21 for forming a stabilized structure. When the rib 211 is inserted into the groove 122, the first frame 10 and the second frame 11 are restrictedly pivotable relative to the tube 21 such that the first frame 10 and the second frame 11 are restrictedly pivotable relative to each other. The first frame 10 has a first wing 111 and a second wing 112 respectively formed on two sides thereof. The second frame 11 has a third wing 101 and a fourth wing 102 respectively formed on two sides thereof. The first wing 111 of the second frame 11 is mounted on a top of the third wing 101 of the first frame 10 and the fourth wing 102 is mounted on a top of the second wing 112 of the second frame 11. The first frame 10 and the second frame 11 are crossly arranged with respect to the tube 21. Multiple stubs 4 are mounted between the first frame 10 and the second frame 11. Precisely, the multiple stubs 4 are sandwiched between the first wing 111 and the third wing 101 and sandwiched between the second wing 112 the fourth wing 102. Each of the first wing 111 and the second wing 112 has multiple bore 14 corresponding to the multiple stubs 4. Each stub 4 has a threaded hole (not numbered) longitudinally defined therein. The multiple stubs 4 are elastomers and are compressible. In the preferred embodiment, each stub 4 is formed of Urethane for absorbing vibration. The multiple stubs 4 are replaceable to be multiple stubs 4 having different rigidity for providing multipurpose.

Figure 3:
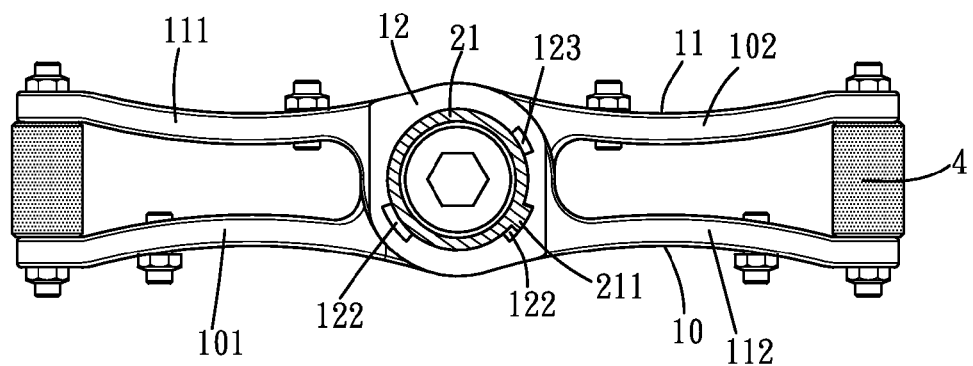
FIGS. 3-4 are side plane operational views of the multipurpose pedal in accordance with the present invention.
Figure 4:
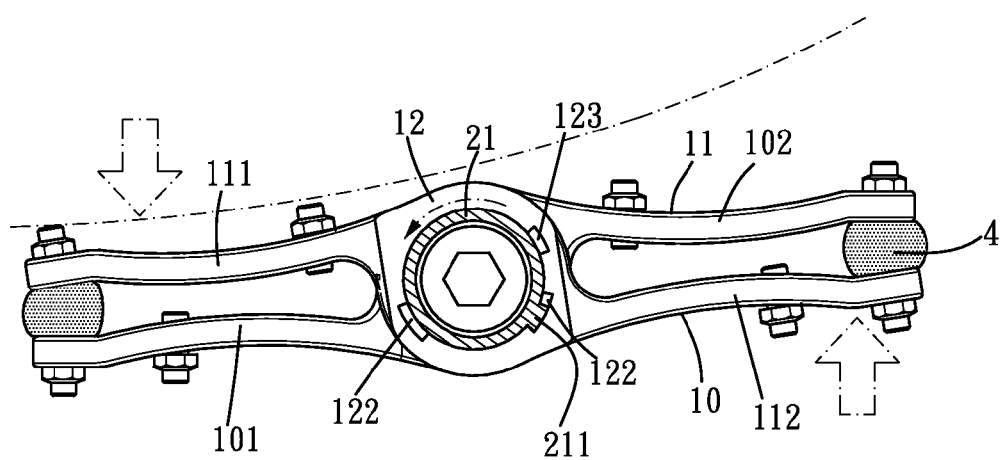

When assembling, the spindle 20 is mounted in the tube 21 via the plastic ring 22, the position ring 23, bearing 24, and the sleeve 25. The tube 21 with the spindle 20 is inserted into the two spindle holes 121 of the first frame 10 and the two spindle holes 121 of the second frame 11. The first frame 10 and the second frame 11 crossly arranged. A pivotal angle between the first frame 10 and the second frame 11 is adjustable due to the width of the groove 122. A cap 3 is plugged into the spindle hole 121 of the first frame 10 for preventing the tube 21 from detaching. Two screws (not numbered) are respectively screwed two ends of each stub 4 via the corresponding bores 14 in the first frame 10 and the second frame 11 for sandwiching the stubs 4 in between the first frame 10 and the second frame 11. As shown in FIGS. 3-4, a weight of a user is supported by the pedal 1. When the pedal 1 is vibrated, the first fame and the second frame 11 are pivotally approached to each other to compress the stubs 4 for absorbing vibrations to provide a shock-absorbed effect. The pivotal angle between the first frame 10 and the second frame 11 is confined by the groove 122 to prevent the first frame 10 and the second frame 11 from overly pivoting relative to the tube 21.

Figure 5:
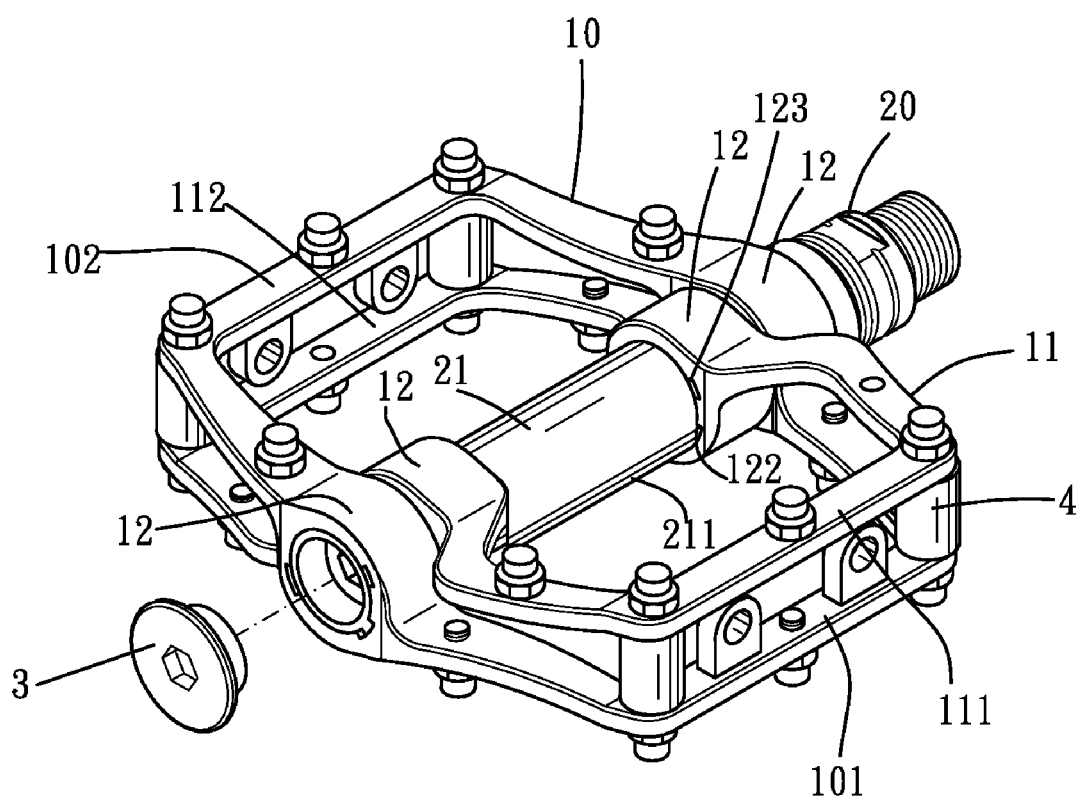
FIG. 5 is a partial exploded perspective view of a second embodiment of the multipurpose pedal in accordance with the present invention.
Figure 6:
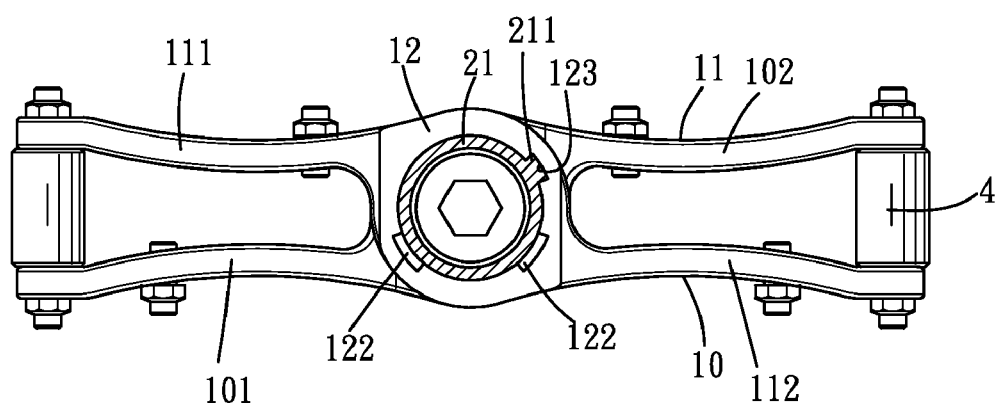
FIG. 6 is a side plane view of the second embodiment of the multipurpose pedal in accordance with the present invention.

With reference to FIGS. 5-6, that shows a second embodiment of the multipurpose pedal in accordance with the present invention. The elements and effects of the second embodiment which are the same with the first embodiment are not described, only the differences are described. The rib 211 of the tube 21 is inserted into the slot 123 in each spindle hole 121 such that the first frame 10 and the second frame 11 are fixed relative to the tube 21. The multiple stubs 4 are replaced to multiple high hardness stubs 4 for forming a stabilized structure.

Figure 7:
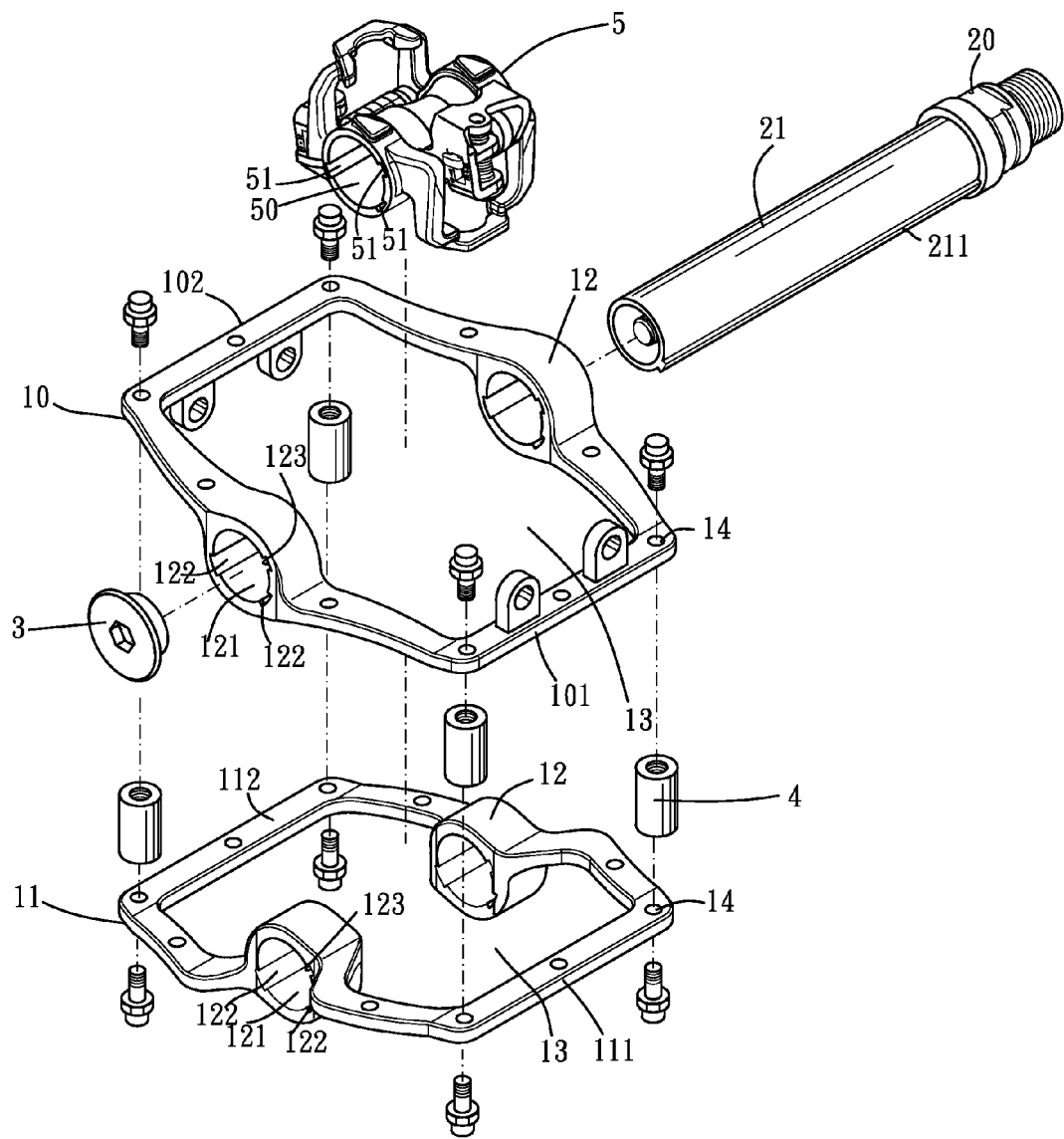
FIG. 7 is a partial exploded perspective view of a third embodiment of the multipurpose pedal in accordance with the present invention.
Figure 8:
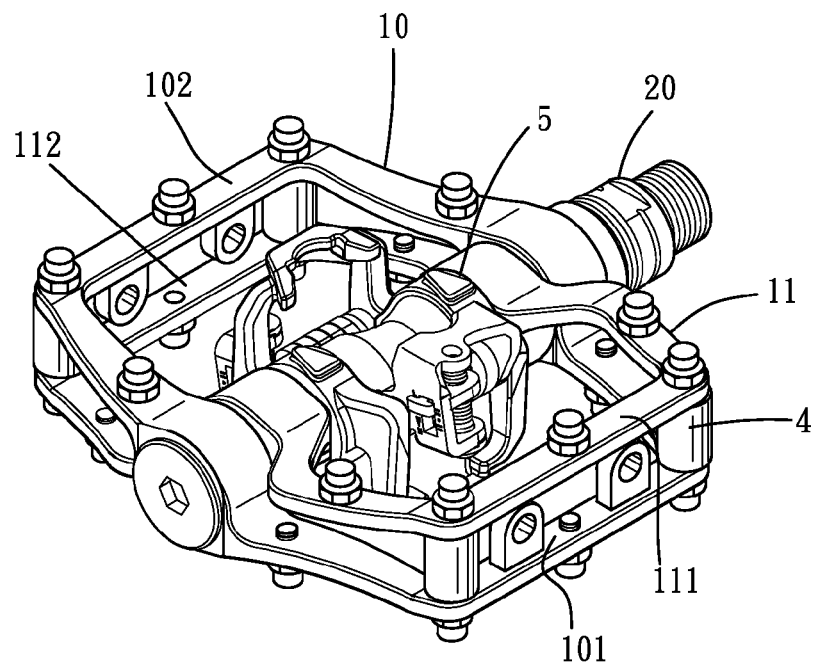
FIG. 8 is an assembled perspective view of the multipurpose pedal in FIG. 7.
Figure 9:
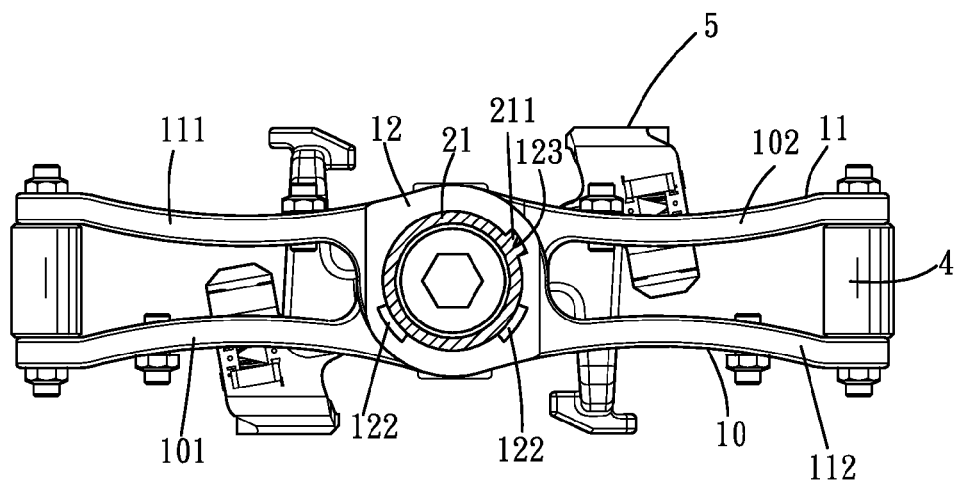
FIG. 9 is a side plane view of the third embodiment of the multipurpose pedal in accordance with the present invention.

With reference to FIGS. 7-9, that shows a third embodiment of the multipurpose pedal in accordance with the present invention. The elements and effects of the third embodiment which are the same with the first embodiment are not described, only the differences are described. A clipless pedal 5 is received in the space 13 in the second frame 11 for adapting to be assembled with a riding shoe. The clipless pedal 5 has a spindle hole 50 defined therein the extending therethrough. The spindle hole 50 in the clipless pedal 5 is aligned with the two spindle holes 121 in the first frame 10 and the two spindle holes 121 in the second frame 11. The spindle hole 50 in the clipless pedal 5 has a groove 51 defined in an inner periphery thereof for correspondingly receiving the rib 211. The clipless pedal 5 is provided for connecting to the riding shoe such that the user can effectively operate the pedal 1.

Although the invention has been explained in relation to its preferred embodiment, it is to be understood that many other possible modifications and variations can be made without departing from the spirit and scope of the invention as hereinafter claimed.

What is claimed is:
1. A multipurpose pedal, comprising:
a spindle assembly, the spindle assembly including a spindle adapting to assemble with a bicycle crank and a tube sleeved on the spindle, the tube having a rib formed on an outer periphery thereof, the tube being rotatable relative to the spindle;
a pedal pivotally assembled with the spindle assembly, the pedal including a first frame and a second frame mounted in the first frame, each of the first frame and the second frame having a space defined therein, the second frame positioned in the space in the first frame, each of the first frame and the second frame having two connecting portion respectively disposed on two ends thereof, the first frame having a first wing and a second wing respectively formed on two sides thereof, the second frame having a third wing and a forth wing respectively formed on two sides thereof, each connecting portion having a spindle hole defined therein and extending therethrough for receiving the tube with the spindle, the two spindle holes in the first frame aligned to each other, the two spindle holes in the second frame aligned to each other, each spindle hole having at least one groove defined in an inner periphery thereof for movably receiving the rib, the two spindle holes in the first frame respectively aligned with the two spindle holes in the second frame, the tube with the spindle inserted into the two spindle holes in the first frame and the two spindle holes in the second frame, each of the at least one groove having a width greater than that of the rib such that the first frame and the second frame are restrictedly pivotable relative to the tube, the first wing of the second frame mounted on a top of the third wing of the first frame, the fourth wing of the first frame mounted on a top of the second wing of the second frame, the first frame and the second frame crossly assembled with respect to the tube, multiple stubs mounted between the third wing and the frost wing and between the fourth wing the second wing, the multiple stubs being replaceable to be multiple stubs having different rigidity for providing multipurpose.

2. The multipurpose pedal as claimed in claim 1, wherein the stubs are elastomers and are compressible; wherein when the pedal is vibrated, the first fame and the second frame are approached to compress the stubs for absorbing vibrations to provide a shack-absorbed effect.

3. The multipurpose pedal as claimed in claim 1, wherein each spindle hole has a slot defined in the inner periphery thereof for correspondingly receiving the rib, when the rib is inserted into the slot of each spindle hole, the first frame and second frame are fixed relative to the tube for forming a stabilized structure.

4. The multipurpose pedal as claimed in claim 1 further comprising a clipless pedal received in the space in the second frame for adapting to be assembled with a shoe, the clipless pedal having a spindle hole defined therein the extending therethrough, the spindle hole in the clipless pedal aligned with the two spindle holes in the first frame and the two spindle holes in the second frame, the spindle hole in the clipless pedal having a groove defined in an inner periphery thereof for correspondingly receiving the rib.

5. The multipurpose pedal as claimed in claim 1, wherein the at least one groove has various width for selectively receiving the rib such that the first frame and the second frame are adjustably approached to each other for adjusting levels of the shack-absorbed effect.

\* \* \* \* \*